July 4, 1950 T. McG. AIKEN 2,514,302
ROTARY BLADE SHUTTER WITH FLASH LAMP
SYNCHRONIZING SWITCH
Filed March 2, 1946 2 Sheets-Sheet 1
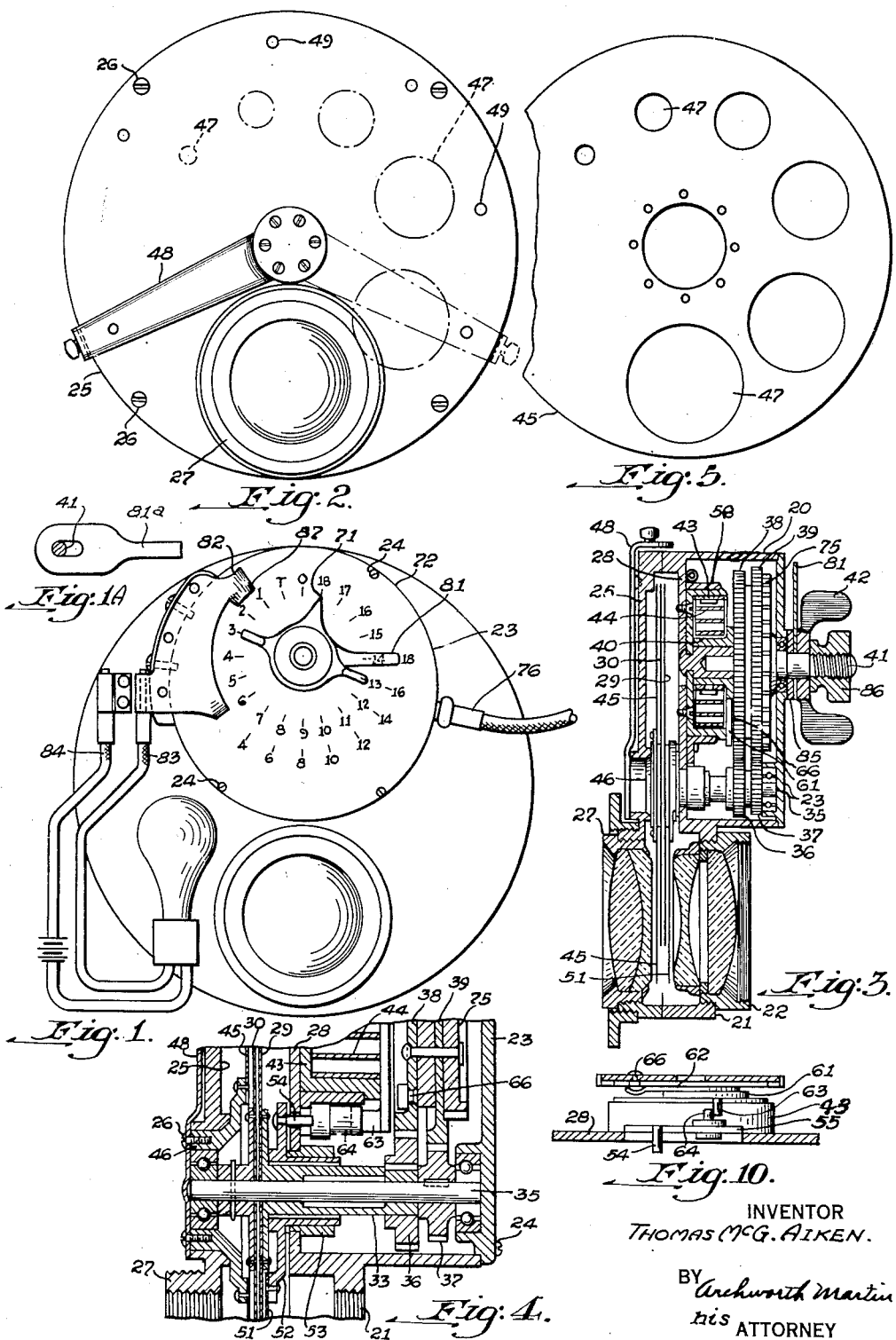
INVENTOR
THOMAS McG. AIKEN.
BY Archworth Martin
his ATTORNEY

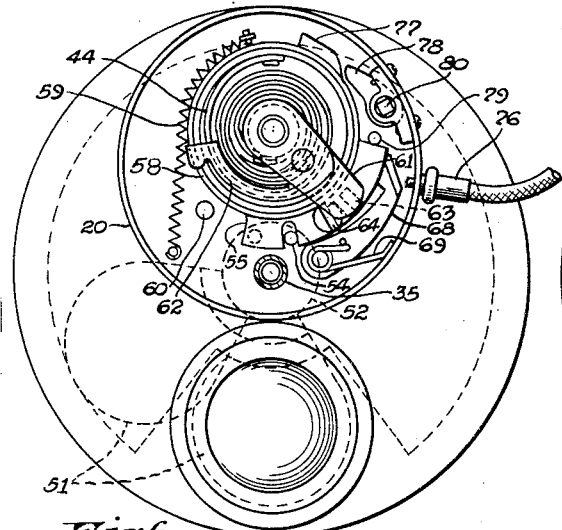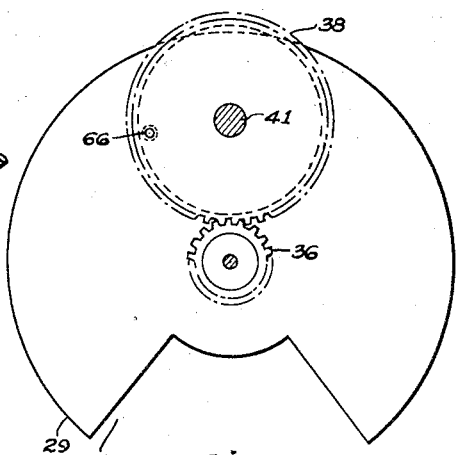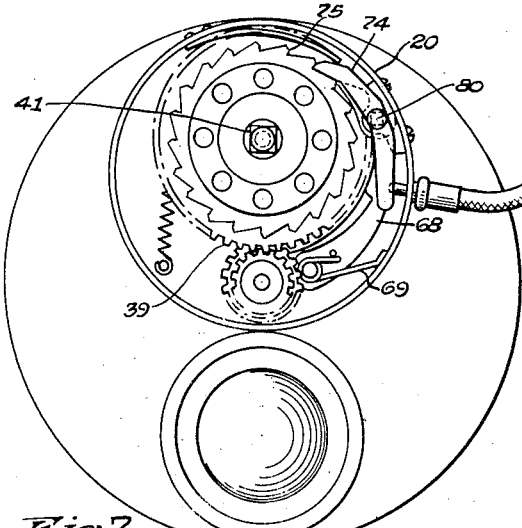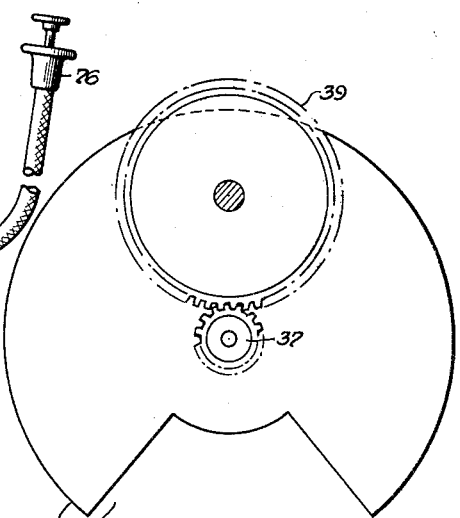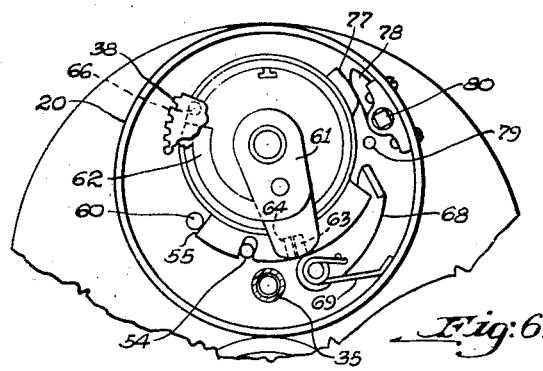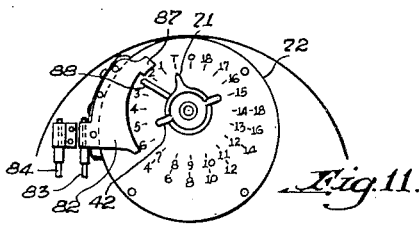
INVENTOR
THOMAS McG. AIKEN
BY Archworth Martin
his ATTORNEY Patented July 4, 1950

2,514,302

UNITED STATES PATENT OFFICE 2,514,302

ROTARY BLADE SHUTTER WITH FLASH LAMP SYNCHRONIZING SWITCH

Thomas McG. Aiken, Pittsburgh, Pa.

Application March 2, 1946, Serial No. 651,484

3 Claims. (Cl. 95—11.5)

This invention relates more particularly to cameras of the rotary shutter type and constitutes a continuation in part of my application Ser. No. 564,195, filed November 20, 1944 (Patent 2,429,972).

One object of my invention is to provide shutter apparatus with an improved form of synchronizing device for controlling a flash lamp circuit, and which is conveniently adjustable in accurately timed relationship with respect to various degrees of shutter-operating tension.

Another object of my invention is to provide shutter and flash lamp synchronizing apparatus of such construction that a synchronizing device for effecting a completion of a flash lamp circuit or an electronic flash can be adjusted to become effective at a desired stage of shutter travel or power spring expansion, which timing can be varied in accordance with the speed at which the shutter is to be operated.

As shown in the accompanying drawings, Figure 1 is a face view of the unit; Fig. 1A shows a modification of the switch arm of Fig. 1; Fig. 2 is a rear view thereof; Fig. 3 is a vertical sectional view through the structure of Figs. 1 and 2; Fig. 4 is an enlarged sectional view of a portion of the structure of Fig. 1; Fig. 5 is a face view of the diaphragm disc; Fig. 6 is a face view of the unit with the front cover plate and a portion of the apparatus removed; Fig. 6A shows some of the apparatus of Fig. 6 in other positions; Fig. 7 is a similar view showing only the cover plate removed; Fig. 8 is a face view of the front shutter disc and the operating gears therefor; Fig. 9 is a face view of the rear shutter disc and the operating gears therefor; Fig. 10 is an edge view of a portion of the apparatus of Fig. 6, and Fig. 11 shows a modification of a portion of the synchronizing apparatus of Fig. 1.

The shutter unit may be attached to various standard types of cameras, after the manner in which other forms of shutter units are applied thereto, and comprises a casing or housing 20 of generally cylindrical form and having a tubular extension 21 with which a lens holder or barrel 22 has screw threaded connection. A front cover plate 23 is secured to the casing 20 by screws 24, and a rear plate 25 is connected thereto by screws 26. The opposed faces of the member 25 and housing wall 28 are recessed as shown in Fig. 3, to accommodate the shutter discs and their supporting elements. A lower portion of the plate 25 has a cylindrical opening with which a lens cell member 27 has threaded engagement, this member being arranged for connection to a camera box or lens board in any well known manner.

Exposures are effected through the operation of rotary shutter discs 29 and 30, an exposure taking place when their cut-outs 31 and 32, respectively, come into axial alinement with one another, between the lens barrel sections 22 and 27. When either or both of these cut-outs has passed from the lens barrel, the admission of light through the lens is shut off.

The shutter disc 29 is mounted on a tubular shaft 33 that is rotatable on a shaft 35 which is supported in bearings carried by the end walls 23 and 25. The shaft 35 carries the shutter disc 30. Gear wheels 36 and 37 are secured to the shafts 33 and 35, respectively, and are driven by gear wheels 38 and 39, respectively.

The gear wheels 38 and 39 are rigidly secured to a shaft 41 that has a handle 42 by which it is turned to place it under spring tension. A spring housing 43 is secured to the casing and has connected thereto one end of a spring 44, the other end of the spring being secured to a bushing 40 on the shaft 41, so that counterclockwise turning of the shaft 41 by its handle 42 and the bushing 40, as hereinafter explained, will place the spring under tension that will rotate the shaft and the gear wheels when the spring is permitted to expand or unwind. This rotation of the gear wheels imparts rotative movement to the shutter members 29—30.

The gear wheels 38—39 turn as a unit, but since the gear wheels 39 and 37 may be 100 teeth and 20 teeth, respectively, and the gear wheels 38 and 36 may have 96 teeth and 24 teeth respectively, the disc 29 will be given four revolutions during each revolution of the shaft 41, while the disc 30 will revolve five times. Various other gear ratios can obviously be employed, it being necessary only that the spaces 31 and 32 in the discs come into alinement with one other, in the lens barrel, at a predetermined stage in each revolution of the shaft 41, to thus provide for the making of an exposure.

Since one disc moves faster than the other, the duration of even partial light opening is less than the time required for the space 31 in the disc 29 to pass the lens, since the space 32 in the disc 30 has, in effect, caught up with the slower moving space 31, in the lens barrel, and immediately begins to shut off the light so that before the space 31 has entirely passed from the lens barrel, the disc 30 will have cut off the light. This, together wit hthe fact that the discs can be rotated a plurality of revolutions for each exposure, and thus acquire a high speed, enables the making of exposures in a shorter time than one-thousandth of a second. This has been proved by a shutter made according to this invention, and operated for a number of months.

A diaphragm disc 45 is secured to a hub 46 that is journaled in the wall 25 and is provided with a plurality of "stop" openings 47 (six being shown in Fig. 5). A setting arm 48 is secured to the hub and has on its inner surface a protuberance that will snap into depressions 49 in the plate 25, which are located at such points relative to the openings 47 that the diaphragm will be yieldably latched when a desired stop opening is brought into axial alinement with the lens barrel, through turning of the arm 48 by the operator.

A safety shield 51 is carried by a hub 52 that is loosely supported for swinging movement in a sleeve 53 secured in the housing 20, the shield being shown in Fig. 3 in its closed position, to shut off passage of light through the lens barrel, when the shutter is being turned and tensioned to make an exposure. A stud 54 is carried by the hub 52 and extends through an arcuate slot in the innerwall 28 of the housing 20. The stud 54 extends into a notch in a flange 55 on a collar 58 (Fig. 6) that loosely fits around the spring housing 43. A spring 59, connected at its ends to the collar 58 and to the housing wall 28, biases the collar 56 in a counterclockwise direction against a stop 79 and thus yieldably holds the safety shield 51 open. A stop 60 limits swinging movement of the collar in the opposite direction.

As above stated, one end of the power spring 44 is connected to the bushing 40 that loosely surrounds the shaft 41. The bushing has an arm 61 rigid therewith that in turn has riveted thereto a leaf 62 of resilient metal. A stud 63 on the arm 61 (Figs. 6 and 10) is engageable with a stud 64 on the flange 55, for the purpose of actuating the collar 56, as hereinafter explained.

Also, a stud 66 is located in a recess in the gear wheel 38, in position to abut against the free end of the flange 62 when the shaft 41 is turned in a counterclockwise direction, to thereby rotate the bushing 40 and place the power spring 44 under tension. In winding the power spring, the stud 66 will be brought into engagement with the free end of the leaf or arm extension 62 thus swinging the arm 61 counterclockwise, to begin tensioning of the power spring. At the beginning of this tensioning movement, the openings 31 and 32 will have passed one another in the lens barrel, and will not again be brought into registry therein during a complete winding of the power spring. Further movement of the arm 61 will cause it to trip a latch 68 against a spring 69, to release the flange 55 and permit the spring 59 to swing the shield 51 out of the lens barrel.

The shaft 41 carries a pointer 71 that moves with the handle 42, on a dial 72. At the point T on the dial, the openings in the shutter blades are in registry. The successive steps numbered 1 to 18 in the annular row of the dial figures represent the degrees of spring tension. Thus at 2 on the scale, the tension will be low and the shutters, upon release of the tension, will not turn very far nor acquire much momentum by the time the shutter openings come into registry in the lens barrel since the distance traveled is from 2 to T. On the other hand, if the handle is given a substantially complete rotation until the pointer 71 reached 17 or 18 on the dial, the shutters will turn several revolutions and acquire great momentum during the expansion of the power spring from approximately its highest tensioned position.

When the handle 42 has been turned the proper distance for a desired spring tension, a latch 74 on a shaft 80 will engage teeth in a ratchet wheel 75 that is secured to the shaft 41. A cable release 76 is provided for tripping the latch. The release of the ratchet wheel 75 permits the arm 61, through its leaf extension 62, to push the stud 66 and the gear wheels 38—39 in a clockwise direction to rotate the shutter blades 29—30 so as to bring their openings into registry in the lens barrel.

Each disc serves, in effect, as a shield for the lens aperture while the opening of the other disc is passing the aperture, until such time as the openings of the two discs come into alinement with one another at the aperture.

As above indicated, the shutter discs may be given several revolutions or even only a partial revolution before coming into registry, depending upon their setting and the degree of spring tension as indicated by the pointer 71. During this rotation of the arm 61, its stud 63 will be brought into engagement with the stud 64 as shown in Fig. 10, thus swinging the collar 56 in a clockwise direction to move the shield 51 to its lowermost or operative position, so that continued rotation of the shutter members will not admit light through the lens barrel. The shield will be held in this position by the latch 68 until released as above explained.

This turning of the collar 56 brings a camming lug 77 thereon into engagement with a finger 78 that is secured to the shaft 80 so as to rock the shaft and hold the pawl 74 away from the ratchet wheel 75 in case the operator has removed his fingers from the cable release. This permits free rotation of the shutter discs 29—30 under the momentum given to them by the power spring, after they have passed exposure position. During this continued movement of the shutter, the stud 66 on the gear wheel will move along the extension 62, in a clockwise direction, the free end of the extension yielding to allow the stud to pass. This provision for continued free movement of the shutter members and the gear wheels is of importance in that they can continue to rotate idly, after exposure, thus avoiding shocks to the mechanism that would occur if they moved against fixed stops while still being subject to momentum imparted thereto by the power spring. Thus, if the power spring is given its full tension by one revolution of the winding key 42, in unwinding, the shaft 41 will continue to rotate freely for perhaps 30 revolutions while the shutter discs 29—30 will rotate for 120 and 150 revolutions, respectively.

For succeeding pictures, the operation above described will be repeated. That is to say, the shaft 41 will be turned counterclockwise to swing the arm 61 to place it under tension and at the same time opening the latch 68 and swinging the collar 56 to move the shield out of the lens barrel and remove the cam surface 77 from beneath the fingers 78 so that the pawl 74 can operate against the ratchet wheel 75. Winding movement of the shaft 41 is limited to substantially a single rotation, by a stud 79 in the casing being engaged by the upper end of the flange 55, the stud 63 on the arm 61 having at this time moved in behind the stud 64 on the flange 55.

An outer row of numerals in the lower portion of the dial 72 is provided for use with a movable switch arm 81. This switch arm is grounded to the casing and turns with the shaft 41, and during an exposure operation is brought into engagement with a stationary switch contact member 82 that is insulated from the casing and is connected to a conductor 83 which, together with a conductor 84 that is grounded to the camera casing, forms a part of an electrical circuit through a flash lamp so that a flash light illumination can be had in proper synchronism with the exposure. The switch arm 81 is frictionally held in rotatably adjusted positions with respect to the handle 42 (Fig. 3), between the handle and a washer 85, by a clamping nut 86. The handle 42 has a squared opening engageable with a squared portion on the shank of the shaft 41, but the arm 81 is rotatably adjustable on the shaft.

It is necessary that the circuit through the flash lamp bulb is completed by the switch arm at about one-fiftieth of a second before the pointer 71 reaches T on the dial (at which time the shutter is opened for exposure). Since the rate at which the pointer and the shutter turn depends upon the degree of tension in the power spring 44, the switch arm 81 has to be adjusted differently for low spring tensions than for higher tensions. For example, if the pointer 71 is set at 4 on the dial, with consequent minor tensioning of the power spring, the switch arm will be set so that it will complete the circuit 1/50 second before the pointer reaches T. At all tensions below 10 on the pointer scale, the switch arm 81 will be set farther back or in a more retracted position relative to the pointer, because the pointer travels under less tension than where it is set at 18 (full tension), for example. In the latter case, the switch arm 81 will actually be set in advance of the pointer 71 so that it will complete the lamp circuit sufficiently far in advance of the shutter opening when the pointer reaches T. For lesser degrees of tensioning, the switch arm 81 will, of course, be set farther back (counterclockwise) relative to the pointer.

The scale represented by the outer row of numerals will be varied to suit various types and strength of power springs, by changing the numerals to indicate the required setting of the switch arm for proper synchronism or timing of the flash.

In Fig. 1A, an arrangement of switch apparatus which differs somewhat from that of Fig. 1 is shown. In this modification, an extension 87 on the stationary contact member 82 may be engaged by a switch arm 81a that is adjustable on the shaft 41, so that it need not engage the main contacting area of 82. By loosening the nut 86 on the shaft 41, the switch arm 81a can be slid radially on the shaft and there clamped in a position that it will move along the entire length of the stationary contact member 82 as does the arm 81, or only along the area at 87. The use of these two adjustments will depend upon whether an ordinary flash lamp is employed or the illumination is secured by what is termed in the camera industry as "electronic flashes." The latter operates much faster than the flash lamps so that the electrical circuit must not be completed until the pointer 71 has reached approximately the point T (open shutter position). For this reason, the shorter contact surface 87 is required, and the switch arm 81a may be set inwardly far enough that it will engage only the contact surface at 87.

In Fig. 11, I show still another modification for utilizing either the full length of the contact member 82 or the shorter contact area 87. Where only the contact area 87 is to be used, a shorter switch arm 88 will be substituted for the switch arm 81. The switch arms 81 and 88 can be substituted for one another by removing the nut 86 and the handle 42.

I claim as my invention:

1. Shutter and flash lamp synchronizing apparatus for use in conjunction with the exposure aperture of a camera, comprising a casing, a pair of shutter elements mounted therein for rotation relative to each other and having openings therethrough that are moved past the aperture during rotation of the elements, to permit passage of light through the aperture when the openings are alined with one another at the aperture, a shaft, a power spring, means operatively connecting one end of the spring to the shaft, means fixedly holding the other end of the spring when it is under tension, gear wheels driven by the shaft and arranged to transmit rotative movements from the shaft to the shutter elements at different relative rates for a plurality of revolutions during a nearly complete revolution of the shaft, and to bring said openings into registry at the aperture for an exposure at a predetermined rotative position of the shaft, means for turning the shaft in a direction to place the spring under driving tension, a dial on the casing having a scale, a pointer rigidly mounted on the shaft and movable along the dial, and so related thereto that during an initial range of spring-winding movement of the shaft, the pointer and the dial will indicate when the shutter elements have been moved to the position at which their openings are in registry at the aperture and will indicate the extent to which the spring tension is increased and the shutter elements rotated through turning of the shaft and winding of the spring, a second scale on the dial calibrated in relation to tensioned positions of the shutter, a switch member mounted on the shaft in proximity to the pointer and movable along the second scale, and a second switch member mounted on the casing in position to be engaged by the other switch member during rotative movement of the shaft, and forming part of a flash lamp circuit, which is completed upon engagement of the switch members, the movable switch member being rotatably adjustable to fixed positions circumferentially of the shaft, whereby it will complete the lamp circuit in desired timed relation to the movement of the shaft toward the point at which exposure is effected through the shutter opening.

2. The combination with a camera having a rotatable shutter that is driven by a coil spring and a shaft that is rigidly connected to one end of the spring, the shaft being rotatable to wind the spring and serving to drive the shutter a plurality of revolutions to effect an exposure, when the spring is released from certain tensioned positions thereof, of a dial on the camera, having a scale, a pointer carried by the shaft and movable therewith along the said scale, to indicate degrees of spring tension, a second scale on the dial calibrated in relation to tensioned positions of the spring, a stationary switch element, a second switch element carried by the shaft and having an arm movable with the shaft and along the second scale, the arm being adjustable relative to the shaft, to definite locations on the second scale, and an electric lamp circuit controlled by the switch elements, whereby the movable switch element can be so located along the second scale with relation to shutter speeds, that it will close the lamp circuit at a point that has been preselected with respect to shutter speed, during the expansion of the spring and rotation of the shutter.

3. The combination with a camera having a rotatable shutter that is driven by a coil spring and a shaft that is rigidly connected to one end of the spring, the shaft being rotatable to wind the spring and to drive the shutter a plurality of revolutions to effect an exposure, when the spring is released from certain tensioned positions thereof, of a dial on the camera, having a scale, a pointer carried by the shaft and movable therewith along the said scale, to indicate degrees of spring tension, a second scale calibrated in relation to tensioned positions of the spring, a stationary switch element, a second switch element carried by the shaft and having an arm movable with the shaft and along the second scale, one of the contact members being adjustable along the path of movement of the said arm, to definite locations on the second scale, and an electric lamp circuit controlled by the switch elements, whereby the lamp circuit will be closed at a point preselected with respect to shutter speed, during the expansion of the spring and rotation of the shutter, the adjustment for the contact member being of such range as to effect closure of the lamp circuit either in advance of the time when the shutter reaches exposure position or after it has reached a point where the exposure begins.

THOMAS McG. AIKEN.

REFERENCES CITED

The following references are of record in the file of this patent:

UNITED STATES PATENTS

| Number | Name | Date |
|---|---|---|
| 1,959,596 | Patterson | May 22, 1934 |
| 1,996,592 | Schwarz | Apr. 2, 1935 |
| 2,117,509 | Schwarz | May 17, 1938 |
| 2,123,112 | Krueger | July 5, 1938 |
| 2,263,045 | Mendelsohn | Nov. 18, 1941 |
| 2,284,486 | Hineline | May 26, 1942 |
| 2,304,035 | Steiner | Dec. 1, 1942 |
| 2,358,941 | Schwarz | Sept. 26, 1944 |
| 2,455,365 | Jenner | Dec. 7, 1948 |